United States Patent [19]

Juen et al.

[11] Patent Number: 5,373,078
[45] Date of Patent: Dec. 13, 1994

[54] LOW VISCOSITY CURABLE ORGANOSILOXANE COMPOSITIONS

[75] Inventors: Donnie R. Juen, Sanford; Lawrence J. Rapson, Bay City; Randall G. Schmidt, Midland, all of Mich.

[73] Assignee: Dow Corning Corporation, Midland, Mich.

[21] Appl. No.: 143,224

[22] Filed: Oct. 29, 1993

[51] Int. Cl.$^5$ ............................................. C08G 77/08
[52] U.S. Cl. ...................................... 528/15; 525/478
[58] Field of Search ...................... 525/478; 528/15

[56] References Cited

U.S. PATENT DOCUMENTS

| | | | |
|---|---|---|---|
| 3,957,713 | 5/1976 | Jeram et al. | 260/32.8 |
| 4,521,471 | 6/1985 | Merrill | 428/40 |
| 4,882,398 | 11/1989 | Mbah | 525/478 |
| 5,082,286 | 1/1992 | Jeram et al. | 524/403 |

*Primary Examiner*—Melvyn I. Marquis
*Attorney, Agent, or Firm*—Robert Spector

[57] ABSTRACT

The addition of up to 40 percent by weight of a non-reactive liquid MQ resin to high viscosity liquid curable organosiloxane compositions that cure by a platinum group metal-catalyzed hydrosilation reaction reduces the viscosity of the composition and the moduli of cured elastomers prepared from said composition without any substantial adverse effect on the physical properties of the cured elastomers, particularly tensile strength, elongation and tear strength. Cured elastomers prepared using these compositions are particularly suitable for use as mold-making and encapsulating materials.

3 Claims, No Drawings

LOW VISCOSITY CURABLE ORGANOSILOXANE COMPOSITIONS

BACKGROUND OF THE INVENTION

1. Field of the Invention

This invention relates to liquid organosiloxane compositions that cure by a platinum catalyzed hydrosilation reaction. More particularly, this invention relates to low viscosity curable organosiloxane compositions that exhibit physical properties in the cured form that previously could only be achieved using relatively high viscosity organosiloxane compositions.

2. Background Information

Many types of ingredients for modifying the properties of cured material prepared from organosiloxane compositions are described in the literature. For example, methods for increasing the tensile and tear strengths of organosiloxane elastomers include increasing the molecular weight of the curable polyorganosiloxane, adding reinforcing fillers such as silica and solid resinous organosiloxane copolymers containing groups that react with the curable polyorganosiloxane and/or the curing agent during curing of the composition. Increasing the molecular weight of the curable polyorganosiloxane and adding a reinforcing filler will increase the viscosity of the curable organosiloxane composition.

For some end use applications of liquid curable organosiloxane compositions such as encapsulating and mold making it is desirable to have a viscosity below about 100 Pa.s to ensure that the composition fills all of the crevices in the mold master or the device to be encapsulated and can be easily freed of air bubbles generated when the ingredients of the compositions are blended. Many compositions that cure by a platinum catalyzed hydrosilation reaction do not have sufficient stability to be stored as one-part materials for any length of time. The organohydrogensiloxane and platinum catalyst are typically packaged in separate containers and are combined shortly before it is desired to cure the composition.

In addition to a low viscosity prior to curing, the cured elastomer used to prepare molds must have sufficient integrity, strength and flexibility to withstand repeated molding cycles during which the mold is substantially deformed and sometimes turned inside out to remove the molded object. Depending upon the type of material being molded the mold can be subjected to temperatures as high as 150° C. and pressures up to 80 p.s.i. (552 kPa.) generated during the formation of polyurethane foams.

The use of resinous polyorganosiloxanes containing reactive groups to decrease the viscosity of organosiloxane compositions that cure by a platinum-catalyzed hydrosilation reaction is described in U.S. Pat. No. 4,882,398, issued on Nov. 21, 1989. The copolymers are solid at room temperature and contain vinyl or other ethylenically unsaturated hydrocarbon radicals that react with the organohydrogen-siloxane(s) present in the curable composition. In addition, the viscosity-reducing effect is observed only with compositions containing liquid polydiorganosiloxanes exhibiting viscosities greater than 12 Pa.s at 25° C.

Organosiloxane compositions that cure by a platinum catalyzed hydrosilation reaction and include liquid polydiorganosiloxanes containing alkenyl radicals and liquid copolymers containing monofunctional $R_3SiO_{\frac{1}{2}}$ or M units and difunctional $R_2SiO$ or D units where R represents a hydrocarbon radical that reacts during curing of the composition are described in U.S. Pat. No. 5,082,886 and U.S. Pat. No. 3,957,713. Combinations of MQ resins with gum type polydiorganosiloxanes for use as pressure sensitive adhesives are described in U.S. Pat. No. 4,521,471.

One objective of this invention is to provide organosiloxane compositions with viscosities below about 100 Pa.s at 25° C. The compositions cure by a platinum-catalyzed hydrosilation reaction to yield strong, tough elastomers that in the past have required high viscosity curable compositions that do not have the flow properties desired for mold making and other applications.

SUMMARY OF THE INVENTION

The objectives of the present invention can be achieved by the addition to curable organosiloxane coinpositions of liquid MQ type organosiloxane resins that do not participate to any significant extent in the curing reaction. The curable compositions contain relatively high molecular weight curable polyorganosiloxanes and fillers of the type required to achieve the desired physical properties in the cured material. The non-reactive liquid resin lowers the viscosity of the curable composition and the moduli of cured materials prepared from these compositions without the adverse effect on other desirable physical properties of the cured materials that has been observed using non-reactive linear polydiorganosiloxanes.

DETAILED DESCRIPTION OF THE INVENTION

This invention provides curable organosiloxane compositions comprising

A. a liquid polyorganosiloxane comprising repeating units of the formula $R^1R^2SiO$ and terminal units of the formula $R^3R^4R^4SiO_{\frac{1}{2}}$, B. an amount sufficient to cure said composition of a liquid organohydrogensiloxane containing at least three silicon-bonded hydrogen atoms per molecule C. an amount sufficient to initiate curing of said composition of hydrosilation catalyst selected from the group consisting of platinum group metals and compounds thereof, and D. a liquid MQ organosiloxane resin comprising M units of the formula $R^6_3SiO_{\frac{1}{2}}$ and Q units of the formula $SiO_{4/2}$, in a molar ratio of from 1 to 2 M units per Q unit, the concentration of said resin being sufficient to reduce the viscosity of said composition by at least 25 percent relative to the viscosity of the composition in the absence of said resin, where $R^2$, $R^4$, $R^5$, $R^6$ and the silicon-bonded organic groups present in said organohydrogensiloxane are individually selected from the group consisting of unsubstituted and substituted monovalent hydrocarbon radicals that are free of ethylenic unsaturation, $R^1$ and $R^3$ are individually selected from alkenyl radicals and the monovalent hydrocarbon radicals represented by $R^2$, with the proviso that said polyorganosiloxane contains an average of at least two alkenyl radicals per molecule, and the weight of said resin does not exceed the weight of said polyorganosiloxane.

The viscosity of preferred curable compositions is below about 100 Pa.s. Above this level the compositions are difficult to process and require longer deairing steps to ensure the absence of bubbles in the cured materials. The lowest viscosity that can be used will be determined at least in part by the physical properties, particularly tensile and tear strength, desired in the cured article.

The presence of the non-reactive MQ resin allows the other ingredients of the curable composition to be varied as required to achieve desired values of durometer hardness and moduli in the cured article without sacrificing other desired physical properties of the cured article.

The Curable Polyorganosiloxane (Ingredient A)

The polyorganosiloxane referred to as ingredient A of the curable organosiloxane compositions of this invention is the principal ingredient of these compositions. This ingredient must contain at least two silicon-bonded alkenyl radicals in each molecule. Suitable alkenyl radicals contain from 1 to about 10 carbon atoms and are exemplified by but not limited to vinyl, allyl and 5-hexenyl. The silicon-bonded organic groups other than alkenyl radicals present in ingredient A are typically monovalent hydrocarbon and halogenated hydrocarbon radicals exemplified by but not limited to alkyl radicals such as methyl, ethyl and propyl; aryl radicals such as phenyl; and halogenated alkyl radicals such as 3,3,3-trifluoropropyl.

The molecular structure of ingredient A is typically linear, however there can be some branching due to the presence of trivalent siloxane units within the molecule. To achieve a useful level of tensile properties in the elastomers prepared by curing the present compositions, the molecular weight of this ingredient should be sufficient to achieve a viscosity at 25° C. greater than about 0.1 Pa.s. The upper limit for the molecular weight of ingredient A will depend upon the application of the cured materials prepared using the present compositions, and is typically limited only by the processability of the curable organosiloxane composition.

A major advantage of using the present liquid non-functional MQ resins is their ability to reduce the viscosity of curable compositions containing the high molecular weight polyorganosiloxane and MQ resins containing vinyl or other alkenyl radicals that act as reinforcing agents for these compositions.

Preferred embodiments of ingredient A are polydiorganosiloxanes represented by formula I

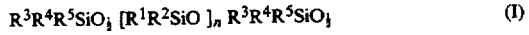

$R^3R^4R^5SiO_{\frac{1}{2}} [R^1R^2SiO]_n R^3R^4R^5SiO_{\frac{1}{2}}$     (I)

$R^2$, $R^4$, and $R^5$ in formula I are individually selected from the group consisting of unsubstituted and substituted monovalent hydrocarbon radicals free of ethylenic unsaturation, and $R^1$ and $R^3$ are individually selected from alkenyl radicals and the monovalent hydrocarbon radicals represented by $R^2$ with the proviso that ingredient A contains an average of at least two alkenyl radicals per molecule, and n represents a degree of polymerization equivalent to a viscosity of at least 0.1 Pa.s (100 centipoise), preferably from 0. 1 to 10 Pa.s.

The hydrocarbon radicals in formula I can be identical or different, and can contain from 1 to about 20 carbon atoms. A range of from 1 to 10 carbon atoms is preferred based on the availability of the corresponding monomers. Most preferably at least one of the hydrocarbon radicals on each silicon atom is methyl, and any remainder are vinyl, phenyl and/or 3,3,3-trifluoropropyl, this preference being based on the availability of the reactants typically used to prepare the polydiorganosiloxane and the properties of cured elastomers prepared from these polydiorganosiloxanes. For the same reasons, $R^9$ is preferably vinyl or 5-hexenyl.

Representative embodiments of ingredient A containing ethylenically unsaturated hydrocarbon radicals only at the terminal positions include but are not limited to dimethylvinylsiloxy-terminated polydimethylsiloxanes, dimethylvinylsiloxy-terminated polymethyl-3,3,3-trifluoropropylsiloxanes, dimethylvinylsiloxy-terminated-dimethylsiloxane/3,3,3-trifluoropropylmethylsiloxane copolymers and dimethylvinylsiloxy-terminated-dimethylsiloxane/methylphenylsiloxane copolymers.

Methods for preparing ingredient A of the present compositions by hydrolysis and condensation of the corresponding halosilanes or by condensation of the cyclic polydiorganosiloxanes are sufficiently disclosed in the patent and other literature that a detailed description in this specification is not necessary.

For applications requiring high levels of physical properties such as tear strength it may be desirable to include in the curable organosiloxane composition a second polydiorganosiloxane containing ethylenically unsaturated hydrocarbon radicals bonded to both terminal and non-terminal silicon atoms.

The Organohydrogensiloxane (Ingredient B)

The curable organosiloxane compositions of this invention contain at least one organohydrogensiloxane that functions as a crosslinker for ingredient A. In the presence of the hydrosilation catalyst, referred to as ingredient C, the silicon-bonded hydrogen atoms in ingredient B undergo an addition reaction, referred to as hydrosilation, with the silicon-bonded alkenyl groups in ingredient A, resulting in crosslinking and curing of the composition.

Ingredient B must contain at least 2 silicon-bonded hydrogen atoms in each molecule. If ingredient A contains only two alkenyl radicals per molecule, ingredient B must contain an average of more than two silicon-bonded hydrogen atoms to achieve a crosslinked structure in the final cured product. The silicon-bonded organic groups present in ingredient B are selected from the same group of monovalent hydrocarbon and halogenated hydrocarbon radicals as the organic groups of ingredient A, with the proviso that the organic groups in ingredient B must be substantially free of ethylenic or acetylenic unsaturation. The molecular structure of ingredient B can be straight chain, branch- containing straight chain, cyclic, or network.

While the molecular weight of ingredient B is not specifically restricted, viscosities in the range of 3 to 10,000 centipoise (0.003 to 10 Pa.s) at 25 degrees Centigrade are preferred.

The concentration of ingredient B is sufficient to provide a molar ratio of silicon-bonded hydrogen atoms to alkenyl radicals in the curable composition of from 0.5 to 20. A range of from 0.5 to 2 is preferred.

When the curable composition contains less than 0.5 moles of silicon-bonded hydrogen atoms per mole of alkenyl radicals the composition cannot be satisfactorily cured. Bubble formation resulting from the generation of hydrogen gas can occur when the composition contains more than about 20 silicon-bonded hydrogen atoms per alkenyl radical.

The Platinum-Containing Hydrosilation Reaction Catalyst (Ingredient C)

Curing of the present compositions is catalyzed by a hydrosilation catalyst that is a metal from the platinum group of the periodic table or a compound of such a metal. These metals include platinum, palladium and rhodium. Platinum and platinum compounds are preferred based on the high activity level of these catalysts in hydrosilation reactions.

Examples of preferred curing catalysts include but are not limited to platinum black, platinum metal on various solid supports, chloroplatinic acid, alcohol solutions of chloroplatinic acid, and complexes of chloroplatinic acid with liquid ethylenically unsaturated compounds such as olefins and organosiloxanes containing ethylenically unsaturated hydrocarbon radicals bonded to silicon. Complexes of chloroplatinic acid with the aforementioned organosiloxanes containing ethylenically unsaturated hydrocarbon radicals are described in U.S. Pat. No. 3,419,593, which issued to David N. Willing on Dec. 31, 1968. The relevant portions of this patent are incorporated herein by reference as a teaching of preferred catalysts.

The concentration of ingredient C in the present compositions is equivalent to a platinum concentration of from 0.1 to 500 parts by weight of platinum metal, preferably from 1 to 50 parts by weight of platinum metal, per million parts (ppm), based on the combined weight of ingredients A and B.

Curing does not proceed satisfactorily at below 0.1 ppm of platinum, while using more than 500 ppm results in no appreciable increase in cure rate, and is therefore uneconomical.

The Organosiloxane Copolymer (MQ Resin, Ingredient D)

The liquid organosiloxane copolymer, also referred to in this specification as an MQ resin, comprises $R^6{}_3SiO_{\frac{1}{2}}$ siloxane units, referred to as M units, and $SiO_{4/2}$ siloxane units, referred to as Q units. The term "soluble" means that the organopolysiloxane can be substantially completely dissolved or dispersed in the polydiorganosiloxane described as ingredient A in a preceding section of this specification. The resin can optionally contain up to 30 mole percent of $R^6{}_2SiO_{2/2}$, referred to as D units, and/or $R^6SiO_{3/2}$, referred to as T units.

The present resins are characterized as "non-reactive" because they do not react during curing of organosiloxane compositions containing these resins. In practical terms, for the present compositions this requires that the resin contain an average of fewer than 0.5 alkenyl radicals or silicon-bonded hydrogen atoms per molecule.

In the formula for the MQ resin $R^6$ represents a monovalent radical that is free from ethylenic unsaturation and is selected from the same group as $R^2$ in the formula for the curable polyorganosiloxane, ingredient A.

The concentration of liquid MQ resin in the present curable composition will be determined, at least in part, by the desired reduction in viscosity resulting from the presence of the resin, the molecular weight of the resin, the viscosity of the polyorganosiloxane (ingredient A) and the effect of the resin on the physical properties of the cured elastomer.

The liquid resin typically constitutes from 2 to about 40 weight percent of the curable composition. At concentrations below about 2 weight percent the resin is at best only marginally effective in reducing the viscosity of the curable composition and the moduli of cured articles prepared from the composition. The physical properties of the cured article, particularly tensile and tear strengths, are adversely affected when the resin concentration exceeds about 40 weight percent. Resin concentrations of from 5 to about 20 weight percent are preferred.

To increase the solubility of the MQ resin in ingredient (A) at least 50 percent of the hydrocarbon radicals represented by $R^6$ should be of the same class, i.e. alkyl, haloalkyl, cycloalkyl, aryl alkaryl, and should contain the same or close to the same number of carbon atoms. i.e. within 1 or 2, as the majority of the hydrocarbon radicals present in ingredient A.

Preferably, at least one-third, and more preferably substantially all of the $R^6$ radicals are methyl radicals. The methyl radicals can be distributed in any desired arrangement among the $R^6{}_3SiO_{\frac{1}{2}}$ siloxane units; however, it is preferred that each of these units contain at least one, and more preferably at least two, methyl radicals. Examples of preferred $R^6{}_3SiO_{\frac{1}{2}}$ siloxane units include $Me_3SiO_{\frac{1}{2}}$, $PhMe_2SiO_{\frac{1}{2}}$ and $Ph_2MeSiO_{\frac{1}{2}}$ where Me represents methyl and Ph represents phenyl.

The MQ resin includes a resinous portion wherein the M or $R_3SiO_{\frac{1}{2}}$ siloxane units are bonded to the Q or $SiO_{4/2}$ units, and each of the Q units bonded to at least one other Q unit. From 5 to about 30 percent of the Q units are bonded to hydroxyl and/or alkoxy radicals, resulting in $ROSiO_{3/2}$ units, thereby accounting for the silicon-bonded hydroxyl and alkoxy content of the resin. The remaining Q units are bonded to other Q units.

Depending upon the method used to prepare the present MQ resins, they may contain a small amount of a low molecular weight material comprised substantially of a neopentamer organopolysiloxane having the formula $(R_3SiO)_4Si$, the latter material being a by-product in the preparation of the resin. Because preferred resins contain at most minimal amounts of the neopentamer, this compound is not included in the following discussion of methods for determining the molecular weight of the resin.

For the purposes of the present invention, the MQ resin should have a number average molecular weight ($M_n$) of about 800 to 2000 when measured by gel permeation chromatography (GPC). These values are obtained using narrow fractions of MQ resins to calibrate the GPC equipment. The absolute molecular weights of the standards are typically determined by a technique such as vapor phase osmometry.

If suitable MQ resin calibration standards are not available, polystyrene standards can be used in their place. If polystyrene standards are used, the $M_n$ values measured for the organosiloxane resins will typically be from 0.3 to 0.5 times the values quoted in the preceding paragraph, which were measured using MQ resin standards.

The MQ resin preferably has an $M_n$ value of from about 1000 to 1500 and consists of $(CH_3)_3SiO_{\frac{1}{2}}$ (M) siloxane units and $SiO_{4/2}$ (Q) siloxane units. Up to about 10 percent of the Q units contain silicon-bonded hydroxyl and or alkoxy groups.

Another key requirement of the MQ resin, also referred to as ingredient D of the present compositions, is that the mole ratio of the total M siloxane units to total Q siloxane units of the resin be between 1 and 2, preferably from about 1.2 to 1.6. Although this ratio is generally inversely related to the molecular size of the average resin particle, the correlation is, at best, only approximate. The above M/Q mole ratios can be easily obtained by $^{29}$Si nuclear magnetic resonance, this technique being capable of quantitatively determining the molar concentration of M, Q, and $ROSiO_{3/2}$, also referred to in this specification as T(OR) units, where R is hydrogen or alkyl.

For the purposes of the present invention, the ratio of M/[Q+T(OR)] must be between 1 and 2.

As used in this specification M/Q represents the molar ratio of the total number of triorganosiloxy groups to the total number of silicate groups of the MQ resin (ingredient D).

Ingredient D can be prepared by any method providing said method provides a soluble organopolysiloxane consisting essentially of $R_3Si_{\frac{1}{2}}$ siloxane units and $SiO_{4/2}$ siloxane units and having a $M_n$ value of from about 800 to 2,000 and an M/Q ratio of 1.0 to 2.0. Ingredient D is preferably prepared by the method described by Shirahata in U.S. Pat. No. 4,707,531, which is incorporated herein by reference insofar as it relates to a method for preparing MQ resins by the gradual addition of an alkyl silicate to an aqueous mixture containing at least 5 weight percent of hydrochloric acid and a trialkylalkoxysilane or bis(trialkyl)disiloxane. The aqueous mixture is maintained at a temperature of from 0° to 90° C. during the addition. The relative amounts of silicate and silane or disiloxane used in the reaction will determine the ratio of M to Q units in the final MQ resin. The amount of water present must be sufficient to hydrolyze all of the hydroxyl groups in the alkyl silicate.

If it is desired to prepare one of the present resins containing up to a total of 30 mole percent of D and/or T units, this can be achieved by including the equivalent molar amounts of the corresponding di- and/or trialkoxysilanes in the reaction mixture.

Optional Ingredients

Platinum Catalyst Inhibitors

Mixtures of the aforementioned ingredients A, B and C may begin to cure at ambient temperature. To obtain a longer working time or "pot life", the activity of the catalyst under ambient conditions can be retarded or suppressed by addition of a suitable inhibitor.

Known platinum catalyst inhibitors include the acetylenic compounds disclosed in U.S. Pat. No. 3,445,420, which issued on May 20, 1969 to Kookootsedes et al. Acetylenic alcohols such as 2-methyl-3-butyn-2-ol constitute a preferred class of inhibitors that will suppress the activity of a platinum-containing catalyst at 25° C. Compositions containing these catalysts typically require heating at temperatures of 70° C. or above to cure at a practical rate.

If it desired to increase the pot life of a curable composition under ambient conditions, this can be accomplished using an alkenyl substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required.

The optimum concentration for a given inhibitor in a given composition can readily be determined by routine experimentation and does not constitute part of this invention.

Some compositions may begin to cure under ambient conditions even when an inhibitor is present. One way to ensure storage stability is to package the ingredients of the curable composition in two or more containers, with the hydrosilation catalyst and the organohydrogensiloxane in separate containers. The contents of the containers are combined when it is desired to cure the composition.

One-part organosiloxane compositions having excellent long-term storage stability at temperature of up to 50° C. or higher can be prepared by first microencapsulating the platinum-containing hydrosilation catalyst in a thermoplastic or thermosetting polymer. Curable organosiloxane compositions containing microencapsulated hydrosilation catalysts are described in U.S. Pat. No. 4,766,176, which issued on Aug. 23, 1988 and U.S. Pat. No. 5,017,654, which issued on May 21, 1991. The teaching of these patents relating to storage stable one-part organosiloxane compositions is incorporated herein by reference. Suitable encapsulants include but are not limited to organosilicon resins and organic resins derived from ethylenically unsaturated hydrocarbons and/or esters of ethylenically unsaturated carboxylic acids such as acrylic and methacrylic acids.

Reinforcing Fillers

To achieve high levels of tear strength and other physical properties that characterize some types of cured elastomers that can be prepared using the compositions of this invention, it may be desirable to include a reinforcing filler such as finely divided silica. Silica and other reinforcing fillers are often treated with one of more of the known filler treating agents to prevent a phenomenon referred to as "creping" or "crepe hardening" during processing of the curable composition.

Finely divided forms of silica are preferred reinforcing fillers. Colloidal silicas are particularly preferred because of their relatively high surface area, which is typically at least 50 square meters per gram. Colloidal silicas can be of the precipitated or a fume type. Both types of silica are commercially available.

The amount of finely divided silica or other reinforcing filler used in the present compositions is at least in part determined by the physical properties desired in the cured elastomer. Liquid or pumpable polyorganosiloxane compositions typically contain from about 10 to about 60 percent by weight of silica, based on the weight of polydiorganosiloxane. This value is preferably from about 30 to about 50 percent.

The filler treating agent can be any of the low molecular weight organosilicon compounds disclosed in the art as being suitable for preventing creping of organosiloxane compositions during processing. The treating agents are typically liquid hydroxyl terminated polydiorganosiloxanes containing an average of from 2 to about 20 repeating units per molecule, and organosilicon compounds such as hexaorganodisiloxanes and hexaorganodisilazanes that hydrolyze under the conditions used to treat the filler to form compounds with silicon-bonded hydroxyl groups. Preferably at least a portion of the silicon bonded hydrocarbon radicals present on the treating agent are identical to a majority of the hydrocarbon radicals present in ingredients A and B. A small amount of water can be added together with the silica treating agent(s) as a processing aid.

It is believed that the treating agents function by reacting with silicon-bonded hydroxyl groups present on the surface of the silica or other filler particles to reduce interaction between these particles.

When a silica filler is used, it is preferably treated in the presence of at least a portion of the other ingredients of the present compositions by blending these ingredients together until the filler is completely treated and uniformly dispersed to form a homogeneous material.

The ingredients that are present during treatment of the filler typically include the silica treating agents and at least a portion of the polydiorganosiloxane(s) referred to herein as ingredient A.

Additional Optional Ingredients

The present organosiloxane compositions can contain one or more additives that are conventionally present in curable compositions of this type to impart or enhance certain physical properties of the cured composition or to facilitate processing of the curable composition.

Typical additives include but are not limited to non-reinforcing fillers such as quartz, alumina, mica and calcium carbonate; pigments such as carbon black and titanium dioxide; dyes, flame retardants, and heat and-/or ultraviolet light stabilizers. Resinous organosiloxane copolymers can be used in place of or in combination with one or more reinforcing fillers to improve the physical properties of the cured organosiloxane composition.

A preferred type of resinous reinforcing copolymer is an MQ resin containing the same types of M and Q units of ingredient D.

The MQ resin used as the reinforcing agent differs from ingredient D in at least two respects. Firstly, the resinous reinforcing agent is a solid at 25° C., which requires that the molar ratio of M to Q units be less than 1, preferably less than 0.8. Secondly, a portion of the hydrocarbon radicals present in the resinous reinforcing copolymer are alkenyl radicals, most preferably vinyl radicals. The vinyl-containing units constitute from 2 to 8 percent by weight of the copolymer, which preferably contains at least one vinyl radical per molecule. In preferred embodiments of the copolymer the ranges for the molar ratio of diorganovinylsiloxy: triorganosiloxy:SiO$_{4/2}$ units is 0.08–0.1: 0.06–1 : 1.

The resinous copolymers can be prepared as described in U.S. Pat. No. 2,676,182, which issued to Daudt and Tyler on Apr. 20, 1954 and is hereby incorporated in this specification by reference thereto. The copolymers described in this patent contain from 2 to 23 percent by weight of hydroxyl groups, which is considerably above the maximum level of about 0.8 weight percent preferred for precursors of the present copolymers. The hydroxyl content of the precursor can be conveniently reduced to the desired level by employing a higher concentration of triorganosiloxane units than the concentration range taught by Daudt et al.

Briefly, the method of Daudt et al. comprises reacting a silica hydrosol under acidic conditions with the appropriate amount of hexamethyldisiloxane or trimethylchlorosilane. The resinous copolymers used to prepare the present elastomers can be obtained by reacting Daudt et al's. product with the required amount of a hexaorganodisilazane, a hexaorganodisiloxane or a chlorosilane wherein each silicon atom contains a vinyl radical and two methyl or other hydrocarbon radicals represented by R$^1$ and R$^2$ in the foregoing formula.

Preparation of Curable Compositions

The compositions of this invention can be prepared by combining all of ingredients at ambient temperature. Any of the mixing techniques and devices described in the prior art can be used for this purpose. The particular device used will be determined by the viscosity of the ingredients and the final curable composition. Suitable mixers include but are not limited to paddle type mixers, kneader type mixers and two- and three-roll rubber mills.

Cooling of the ingredients during mixing may be desirable to avoid premature curing of the composition.

To maximize storage stability the curable compositions are preferably kept in closed containers until used. If greater storage stability is desired, the compositions can be packaged in two or more containers with the organohydrogensiloxane (ingredient B) and the platinum group metal catalyst in separate containers.

Depending upon the types and concentrations of ingredients A and B, cured organosiloxane materials prepared using the present compositions can vary in properties from brittle resins to elastomers to gels, and are useful in a variety of end-use applications, including coatings and molded or extruded articles. Elastomers prepared using the present compositions are particularly useful as mold-making materials due to their lower moduli and relatively high tear strength.

Preferred compositions cure over a period of several hours under ambient conditions. As is true for other compositions that cure by a platinum-catalyzed hydrosilation reaction, curing can be accelerated by heating. Curing temperatures of from 25° to about 150° C. are preferred.

EXAMPLES

The following examples describe preferred embodiments of the present curable organosiloxane coinpositions and the improvements achieved by the presence of liquid non-functional MQ resins to compositions, and should not be interpreted as limiting the invention defined in the accompanying claims. Unless otherwise specified all parts and percentages in the examples are by weight and viscosities were measured at 25° C.

Example 1

This example demonstrates the reduction in viscosity of curable compositions and the maintenance or improvement in physical properties, including moduli reduction, of cured articles achieved using three types of non-reactive MQ organosiloxane resins that do not participate to any significant extent in the curing reaction.

Curable organosiloxane compositions were prepared by blending the following ingredients to homogeneity:

Ingredient A1—a mixture consisting essentially of 82 weight percent of a dimethylvinylsiloxy-terminated polydimethylsiloxane having a viscosity of about 55 Pa.s at 25° C. and 18 weight percent of a resinous benzene-soluble copolymer containing triorganosiloxy units and SiO$_2$ units in the mol ratio of about 0.7 mol of triorganosiloxy unit per mol of SiO$_2$ units, where the triorganosiloxy units are trimethylsiloxy and dimethylvinylsiloxy, and the copolymer contains from 1.4 to 2.2 weight percent of silicon-bonded vinyl radicals;

Ingredient A2—a liquid dimethylvinylsiloxy terminated polydimethylsiloxane exhibiting a viscosity of about 55 Pa.s at 25° C.;

Ingredient B—a trimethylsiloxy-terminated polydiorganosiloxane containing an average of five methylhydrogensiloxane units and three dimethylsiloxane units per molecule with a silicon-bonded hydrogen atom content in the range from about 0.7 to 0.8 weight percent;

Ingredient C—a reaction product of hexachloroplatinic acid and sym-tetramethyldivinyldisiloxane that has been diluted with a liquid dimethylvinylsiloxy terminated polydimethylsiloxane in an amount sufficient to achieve a platinum content of 0.7 weight percent;

Ingredient E—cyclic methylvinylsiloxanes as a platinum catalyst inhibitor; and

Ingredient F—finely ground quartz with an average particle size of 5 microns.

Ingredient G—A violet pigment

The MQ resins used as ingredient D are identified by the molar ratio of M or $(CH_3)_3SiO_{\frac{1}{2}}$ (trimethylsiloxy) units to Q or $SiO_{4/2}$ units. For example, the resin identified as M2Q contains 2 moles of trimethylsiloxy units for each mole of Q units.

The number average molecular weights of the resins were determined using Varian TSK 4000+2500 columns at 35° C. and a chloroform mobile phase at 1 mL/min. Resin standards were used for linear regression calibrations. An IR detector set at 9.1 microns to detect Si—O—Si was used for the measurements.

The amounts of the various ingredients used in each of the compositions evaluated are summarized in Table 1. Samples 2, 3 and 4 contained 6.7 weight percent of an MQ resin and samples 5, 6 and 7 contained 13.4 weight percent of an MQ resin. Sample 1 did not contain ingredient D and was used as a control.

TABLE 1

| Ingredient | Sample No. | | | | | | |
|---|---|---|---|---|---|---|---|
| (Parts) | 1(C) | 2 | 3 | 4 | 5 | 6 | 7 |
| A1 | 65.4 | 61.4 | 61.4 | 61.4 | 57.5 | 57.5 | 57.5 |
| A2 | 3.8 | 3.6 | 3.6 | 3.6 | 3.3 | 3.3 | 3.3 |
| C | 0.28 | 0.26 | 0.26 | 0.26 | 0.24 | 0.24 | 0.24 |
| F | 36.5 | 34.1 | 34.1 | 34.1 | 31.6 | 31.6 | 31.6 |
| M2Q | 0 | 6.7 | 0 | 0 | 13.4 | 0 | 0 |
| M1.4Q | 0 | 0 | 6.7 | 0 | 0 | 13.4 | 0 |
| m1.1Q | 0 | 0 | 0 | 6.7 | 0 | 0 | 13.4 |

All of the compositions contained 3.15 parts of ingredient B, 0.2 part of ingredient E and 0.68 parts of ingredient G. A second comparative sample, referred to as sample 8, was prepared using 5 weight percent of a trimethylsiloxy-terminated polydimethylsiloxane exhibiting a viscosity of 0.1 Pa.s in place of the MQ resin.

The viscosity of each of the curable compositions was measured and the compositions were then molded into test samples that were cured at 23° C. for 24 hours and evaluated in accordance with the appropriate ASTM (American Society for Testing of Materials) for measuring tensile strength, elongation, tear strength (die B), durometer hardness (Shore A scale) and stress at 100 % elongation.

The results of these measurements are recorded in Table 2.

TABLE 2

| | Sample No. | | | | | | | |
|---|---|---|---|---|---|---|---|---|
| | 1(C) | 2 | 3 | 4 | 5 | 6 | 7 | 8(C) |
| Viscosity (Pa.s) | 85 | 61.4 | 62.5 | 65.0 | 37.7 | 40.1 | 45.2 | 57.5 |
| Durometer (Shore A Scale) | 58 | 53 | 52 | 52 | 43 | 43 | 44 | 46 |
| Stress at 100% Elongation (MPa)* | 5.26 | 4.62 | 4.51 | 4.54 | N.D. | 3.44 | N.D. | 3.71 |
| Tear Strength (N/m) | 18.2 | 16.1 | 16.3 | 16.5 | 13.7 | 14.7 | 15.1 | 13.8 |
| Tensile Strength (KPa) | 5.8 | 5.3 | 5.3 | 5.2 | 4.6 | 4.5 | 4.7 | 4.3 |
| Elongation (%) | 192 | 197 | 246 | 216 | 213 | 203 | 207 | 221 |

* = Also referred to as 100% tensile modulus, measured at a sample extension rate of 20 inches (50 cm) /minute
N.D. = Not determined Example 2

This example demonstrates the relatively poor physical properties of cured elastomers prepared using curable compositions containing non-reactive linear polydimethylsiloxanes in place of the MQ resins of this invention.

Curable organosiloxane compositions were prepared using the ingredients described in Example 1 but replacing the MQ resin with one of three different liquid trimethylsiloxy-terminated polydimethylsiloxanes exhibiting viscosities of 10, 0.35 and 0.2 Pa.s at 25° C. Each of these three polymers, referred to as H1, H2, and H3, respectively, were added at concentrations of 6.68 (composition 2a) and 13.36 weight percent (composition 2b), based on the weight of the curable composition.

In addition to one of the three trimethylsiloxy-terminated polydimethylsiloxanes, composition 2a contained 61 parts of ingredient A1, 3.6 parts of ingredient A2, 0.26 part of ingredient C and 34.1 part of ingredient F. Composition 2b contained 57.5 parts of ingredient A1, 3.3 parts of ingredient A2, 0.24 part of ingredient C and 31.6 parts of ingredient F. Both compositions contained 3.15 parts of ingredient B, 0.2 part of ingredient E and 0.68 part of ingredient G.

A sample prepared without any trimethylsiloxy terminated polydimethylsiloxane was used as a control. Samples were molded as described in Example 1. The properties of the cured samples are recorded in Table 3.

TABLE 3

| | Composition 2a | | | Composition 2b | | | |
|---|---|---|---|---|---|---|---|
| Modifier | H1 | H2 | H3 | H1 | H2 | H3 | CONTROL |
| Tensile (Mpa) | 4.4 | 4.3 | 3.9 | 4.4 | 3.9 | 4.0 | 5.2 |
| Elongation (%) | 236 | 253 | 330 | 189 | 307 | 230 | 202 |
| Durometer (A) | 54 | 46 | 41 | 48 | 41 | 42 | 54 |
| Tear Strength kN/m | 14.9 | 13.4 | 10.5 | 14.1 | 11.6 | 11.0 | 17.9 |
| Stress @ 100% Elong. (MPa)* | 3.44 | 3.48 | 2.62 | 3.62 | 0.69 | 2.98 | 4.75 |
| Viscosity (Pa.s) | 684 | 520 | 356 | 564 | 544 | 340 | 875 |

* = Stress at 100% elongation also referred to as 100 tensile modulus

The data in Table 3 demonstrate that while ingredients H1, H2, and H3 reduced the viscosities of the curable compositions containing these additives, the tensile strength, tear strength and durometer hardness of the cured elastomers prepared from these compositions are substantially lower and the elongation values substantially higher relative to the properties of the unmodified control.

That which is claimed is:

1. A curable organosiloxane compositions comprising
   A. a liquid polyorganosiloxane comprising repeating units of the formula $R^1R^2SiO$ and terminal units of the formula $R^3R^4R^5SiO_{\frac{1}{2}}$,
   B. an amount sufficient to cure said composition of a liquid organohydrogensiloxane containing at least three silicon-bonded hydrogen atoms per molecule
   C. an amount sufficient to initiate curing of said composition of hydrosilation catalyst selected from the group consisting of platinum group metals and compounds thereof, and
   D. a liquid MQ organosiloxane resin comprising M units of the formula $R^6{}_3SiO_{\frac{1}{2}}$ and Q units of the formula $SiO_{4/2}$, in a molar ratio of from 1 to 2 M units per Q unit, the concentration of said resin being sufficient to reduce the viscosity of said composition by at least 25 percent relative to the viscosity of the composition in the absence of said resin, where $R^2$, $R^4$, $R^5$, $R^6$ and the silicon-bonded organic groups present in said organohydrogensiloxane are individually selected from the group consisting of unsubstituted and substituted monovalent hydrocarbon radicals that are free of ethylenic unsaturation, $R^1$ and $R^3$ are individually selected from the group consisting of alkenyl radicals and the monovalent hydrocarbon radicals represented by $R^2$, with the proviso that said polyorganosiloxane contains an average of at least two alkenyl radicals per molecule, and the weight of said resin does not exceed the weight of said polyorganosiloxane, 2. A composition according to claim 1 wherein the viscosity of said composition is less than 100 Pa.s, the molar ratio of M units to Q units in said resin is from 1.2 to 1.6, said resin constitutes from 2 to 40 weight percent of said composition, the number average molecular weight of said resin is from 800 to 2000, $R^1$, $R^4$, $R^5$ and $R^6$ are individually selected from alkyl radicals containing from 1 to 10 carbon atoms, $R^2$ is selected from the group consisting of unsubstituted and substituted alkyl radicals containing from 1 to 10 carbon atoms, phenyl, vinyl, allyl and 5-hexenyl radicals, $R^3$ is selected from vinyl, allyl or 5-hexenyl, the concentration of said organohydrogensiloxane is equivalent to a molar ratio of silicone-bonded hydrogen atoms to alkenyl radicals in said composition of from 0.5 to 2 and said MQ resin contains up to a total of 30 mole percent of $R^6{}_2SiO_{2/2}$ units, $R^6SiO_{3/2}$ units or a mixture of said units.

3. A composition according to claim 2 where said resin constitutes from 5 to 20 weight percent of said composition, said polyorganosiloxane is a polydiorganosiloxane exhibiting a viscosity of from 0.1 to 10 Pa.s at 25° C., $R^1$, $R^4$, $R^5$, $R^6$ and the hydrocarbon radicals present in said organohydrogensiloxane are methyl, $R^2$ is methyl or vinyl, the concentration of said hydrosilation catalyst is from 0.1 to 500 parts of said platinum group metal per million parts of said composition, the viscosity of said organohydrogensiloxane is from 0.003 to 10 Pa.s at 25° C., and said resin contains up to a total of 30 mole percent of at least one of $R^6{}_2SiO_{2/2}$ and $R^6SiO_{3/2}$ and an average of from 0 to 0.5 alkenyl radical or silicon bonded hydrogen atom per molecule.

* * * * *